United States Patent Office 2,944,999
Patented July 12, 1960

2,944,999

RESINOUS COMPOSITIONS LIGHT STABILIZED WITH A 2,4-DIAMINO-6-(p-ALKOXY-STYRYL)-s-TRIAZINE

Francis J. Abbruscato, Stamford, Conn., assignor to American Cyanamid Company, New York, N.Y., a corporation of Maine No Drawing. Filed Sept. 26, 1958, Ser. No. 763,441

15 Claims. (Cl. 260—45.8)

This invention relates to light-stabilized, amino-aldehyde resinous condensation products. More particularly, this invention relates to thermosetting resinous compositions comprising a condensate of melamine, benzoguanamine or urea with formaldehyde, which compositions contain a 2,4-diamino-6-(p-alkoxystyryl)-S-triazine as a U.V. light absorbing component. This present invention also relates to the light-stable, infusible and insoluble products obtained by heat-curing the aforesaid thermosetting compositions.

It is an object of this invention to stabilize resinous materials obtained by condensing an amino or amido compound with an aldehyde against deleterious effects resulting when said materials are actinically exposed.

A specific object of this invention is to provide thermosetting melamine-formaldehyde resinous compositions capable of being cured to light-stable, insoluble and infusible products.

These and other objects of this invention will be more fully outlined in the discussion and examples appearing hereinbelow.

The thermosetting amino-aldehyde resins as exemplified by a condensate of melamine or urea with formaldehyde are well-known. While these resins have been employed in literally countless types of applications, this invention especially pertains to those types of condensates particularly useful in the molding, protective coating and related arts. As is well-recognized, these so-called amino resins, particularly those condensates derived from the aminotriazines when employed in the aforesaid arts impart a great plurality of beneficial properties to the ultimate product. Ordinarily, resins derived from the aminotriazines and carbamides are considered to have relatively good color retention properties; that is, they are regarded as having a high degree of resistance to yellowing and darkening induced by heat or exposure to sunlight. Nevertheless, amino resins of the type under discussion are known to be adversely affected, as manifested by visually observable yellowing and darkening, upon prolonged exposure to sunlight. By the practice of this invention any deleterious color changes may be substantially precluded thus making it possible to prepare extremely light-stable resinous products. An additional attribute of this invention is that the use of my novel light-absorbing agent serves to protect other materials that may be used with the amino resin. This utility has in mind certain specific applications of the resin such as encountered in the decorative laminating art.

Various materials have been suggested in the prior art as ultraviolet absorbing agents for plastic materials. In order to be a good ultraviolet absorber, the material should absorb the ultraviolet light and at the same time be a substantially colorless material which imparts little or no color to the composition in which it is used. Also, it should be sufficiently stable to withstand the conditions of forming or curing of the plastic. Furthermore, the U.V. absorbing material must have sufficient solubility in one or more of the various components comprising the plastic formulation so that it may be easily and uniformly incorporated therein and will not subsequently result in a condition of "blooming." Thus, it can be readily appreciated that in order for a given U.V. absorber to be considered an effective light-stabilizer, a host of requirements are to be met which are fundamentally unrelated to the absorber's capability to dissipate the U.V. radiation. It is readily apparent, therefore, that the nature of the resinous material to be stabilized is of a prime consideration in regard to an absorber's potential as a stabilizer therefor. For example, the various benzophenones have enjoyed great favor as absorbing agents for many types of resinous materials; however, their use with amino resins has been extremely limited because of one or more inherent shortcomings relating to the requirements mentioned directly hereinabove. The light-stabilizers of this invention, on the other hand, when employed with an amino resin exhibit no significant shortcomings.

Generally, an effective ultraviolet absorber should have its peak absorption above about a wave length of 320 millimicrons. The absorption peak may be at a higher wave length, as long as absorption drops off sufficiently as it approaches the visual range so that the absorbing compound contributes little or no visible color. In addition, to be effective, it should show a high degree of absorbency in the desired wave-length range. As a measure of the degree of absorbency, an absorption index may be used. This represents the degree of absorption of light of a selected wave length per amount of material with a higher absorbency index indicating greater absorption. For the most desirable ultraviolet protection, the peak absorbency index should occur at a wave length sufficiently below the visual range so that the absorbing compound has little or no yellow color. The 2,4-diamino-6-(p-alkoxystyryl)-S-triazines of this invention exceed the minimum requirements of the above-stated absorption properties which characterize an effective ultraviolet absorber.

The light-absorbing compounds useful in the practice of this invention are represented by the following general formula:

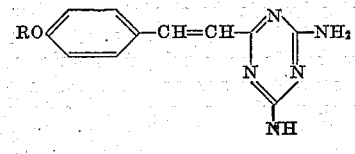

wherein R is an alkyl group, preferably containing not in excess of 4 carbon atoms, although the higher homologs thereof are contemplated.

These compounds may be readily prepared by condensing an aromatic aldehyde or carboxylic acid with acetoguanamine in the presence of sulfuric acid. Such a method is set forth in Chem. Zent. 1907, II, 706. Thus, 2,4-diamino-6-(p-methoxystyryl)-S-triazine is prepared according to this procedure by reacting equal parts of anisaldehyde and acetoguanamine in the presence of concentrated sulfuric acid. The amount of acid to be employed is in the order of one and one-half times the weight of the condensing reactants. The reaction is brought to completion by heating the reactants on a steam bath for a period generally not exceeding one hour.

The condensation product is recovered by slurrying the reaction mixture with water and then filtering. Purification is accomplished by dissolving the crude product in a suitable solvent, such as butanol, and recovering by conventional crystallization techniques. The various other compounds contemplated in this invention may be prepared in the same manner by employing an aromatic aldehyde containing the desired alkoxy substituent in the para position. Methods for preparing the various aromatic aldehydes containing an alkoxy group in the para position are well-known in the art.

Illustrative of the compounds of the general formula which may be used in accordance with this invention besides the methoxy derivative mentioned hereinabove are such as 2,4-diamino-6-(p-ethoxystyryl)-S-triazine, 2,4-diamino-6-(p-propoxystyryl)-S-triazine, 2,4-diamino-6-(p-isopropoxystyryl)-S-triazine, 2,4-diamino-6-(p-butoxystyryl)-S-triazine, 2,4-diamino-6-(p-isobutoxystyryl)-S-triazine, 2,4-diamino-6-(p-pentoxystyryl)-S-triazine, 2,4-diamino-6-(p-hexoxystyryl)-S-triazine, 2,4-diamino-6-(p-octoxystyryl)-S-triazine, etc. Further details regarding the preparation of the light-stabilizers of this invention will be set forth in the specific embodiments hereinbelow.

The amount of light absorber which has been found to be effective for stabilizing the amino resins of this invention varies from about 0.01 to 5% based on the resin solids. The preferred range is from about 0.1 to 2%. The method for incorporating the light absorber within the plastic composition is not critical. The absorber is most conveniently incorporated in resinous compositions designed for use in molding applications by adding the stabilizer to the reaction syrup just subsequent to the completion of the condensation reaction and prior to desiccation if the latter is practiced. The main objective for any method of incorporating the light absorber is to obtain a thorough dispersion of the absorber within the resinous carrier. This obviously is mechanically more easily accomplished when the resinous material is in the form of a liquid syrup. However, dry mixing procedures, such as ball-milling the light absorber into a molding composition, will result in an acceptable manner of combining the absorber with the resinous material.

The thermosetting amino-aldehyde resins, which when stabilized with the aforesaid 2,4-diamino-6-(p-alkoxystyryl)-S-triazines constitute the novel resinous compositions of this invention, may be prepared by reacting an aldehyde with an amidogen compound. The thermosetting amino-aldehyde resins contemplated herein may either be simple alkylolated, preferably methylolated, derivatives of the amidogen or they may be soluble condensates beyond the alkylolation stage. The resins contemplated also include the alkylated or ether type resins used almost exclusively in protective coating applications.

The term amidogen employed herein contemplates compounds containing one or more amino or imino or amido groups, which groups contain aldehyde reactive hydrogens. The preferred amidogens that can be used to prepare the condensates useful in this invention are melamine, benzoguanamine and urea. However, while the preferred amidogens are those stated hereinabove, other types of amidogens may be advantageously employed. Illustrative examples of other triazine amidogens that may be used solely, or preferably in combination with the preferred triazine amidogens wherein the preferred species constitutes the major proportion of the amide-bearing component, are triazines containing at least one amino group, e.g., acetoguanamine, formoguanamine, 2-amino-1,3,5-triazine, 2,4,6-tris(monoalkylamino)-1,3,5-triazines [e.g., 2,4,6-tris(ethylamino)-1,3,5-triazine], 2,4,6-tris(arylamino)-1,3,5-triazines [e.g., 2,4,6-tris(phenylamino)-1,3,5-triazine], melam, melem, melom, 2-chloro-4,6-diamino-1,3,5-triazine, 2-amino-4-hydroxyl-6-phenyl-1,3,5-triazine, 2,4-diamino-6-methylamino-1,3,5-triazine, ammeline, ammelide, and the like. In addition to these triazine amidogens, one may use diazine amidogens such as 2,5-diamino-1,3,4-thiadiazine singly or in combination with said triazine. Also, other amidogens not containing the azine structure may be used singly or in combination with one or more of the triazine amidogens mentioned hereinabove. These include amidogens such as certain guanazoles, e.g., guanazole, guanazoguanazole, biguanides such as phenyl biguamide, urea, thiourea, biuret, dicyandiamide and the like.

As stated, the thermosetting amino-aldehyde condensates employed in the compositions of the present invention may be derived by effecting condensation of the aldehyde reactant with the amidogen. The ratio of aldehyde to the aldehyde-reactable amidogen can be varied over a wide range depending, for example, upon the number of aldehyde-reactable amide groups in the amidogen and upon particular properties desired in the final condensation product. The aldehyde, for example formaldehyde, can be used in an amount sufficient to react with from one to all of the reactive hydrogens of the amido or amino groups or the amidogen. Thus, from one to six mols of the aldehyde per mol of amidogen may be used when the amidogen compound consists of melamine. Similarly, when either benzoguanamine or urea is employed, one to four mols of aldehyde per mol of said amidogens can be used. The preferred molar ratios of aldehyde to amidogen are 1.0–3.0 when the amidogen is melamine and 1.0–2.0 when the amidogen employed is benzoguanamine or urea.

The initial condensation reaction between the aldehyde, specifically formaldehyde, and the amidogen may be carried out at normal or at elevated temperatures; at atmospheric, sub-atmospheric or super-atmospheric pressures; and under neutral, alkaline or acid conditions. In the preparation of unalkylated condensates, it is generally preferred that the polymerization and dehydration be effected under basic conditions in the range of pH 7.0–11.0 and more preferably in the range of pH 9.0–10.0 at a temperature from 25 to 105° C. When it is desired to carry out the condensation under alkaline conditions, any substance yielding an alkaline aqueous solution may be used, for example alkali metal or alkali earth metal oxides, hydroxides or salts thereof with weak acids. Specifically, one may use sodium, potassium or calcium hydroxide, sodium or potassium carbonate. Further, one may use mono-, di- or triamine, aqueous ammonia, etc., to effect alkaline conditions. Illustrative examples of acid condensation catalysts that may be employed are organic and inorganic acids, e.g., hydrochloric, sulfuric, phosphoric, acetic, lactic, phthalic, maleic, etc., or acid salts such as sodium acid sulfate, mono sodium phosphate, mono sodium phthalate, etc.

Where it is desired to prepare alkylated condensates, the preferred ratios of aldehyde to amidogen are somewhat higher than the preferred ranges employed in the preparation of the unalkylated condensates. For example, in preparing an alkylated melamine resin the ratio of formaldehyde to melamine is generally somewhat greater than 3.0 and ranges up to 6.0. The process of condensing the alkylated variety of condensate differs also from the usual manner for the processing of an unalkylated type principally in that the condensation is carried out at under basic conditions initially, preferably in the presence of the alkylating agent, and then resorting to the use of acidic conditions for suitable utilization of the alkylating material. Substantial excesses of the alkylating agent are conventionally employed in the reaction mixture and when a sufficient quantity of the alkylating material has reacted with the condensate, the excess is removed by distillation procedures. The removal of the excess alkylating agent also facilitates the removal of the water in the reaction system. This dehydration step is generally referred to as azeotropic distillation when an alkylating agent such as butanol is used which forms an azeotrope with water.

The condensation reaction between the amidogen and aldehyde may be carried out in a single-stage operation as exemplified in British Patent No. 673,742, wherein all of the aldehyde to be employed is initially present with the amidogen. In the alternative, the condensation reaction may be carried out in multiple stages. In such a procedure the aldehyde to be employed is added in fractional amounts of the total in separate stages. This method is primarily useful because it permits the condensation reaction to be carried out at comparatively high solid contents thus permitting economical dehydration of the resinous syrup. The said multiple-stage technique is disclosed in U.S. Patent No. 2,841,571.

The condensation reaction between the amidogen and aldehyde may be carried out in an aqueous or non-aqueous medium. Where it is desired to prepare an un-alkylated condensate, the employment of an aqueous medium is preferred. However, suitable non-aqueous media are water-soluble alcohols, ketones and such polar materials as dimethylformamide, dioxane, tetrahydrofurane and the like. On the other hand, where an alkylated condensate is desired, the use of a non-aqueous medium substantially corresponding to the type of alkylating agent used in preferred.

Formaldehyde or compounds engendering formaldehyde such as paraformaldehyde, hexamethylenetetramine and the like, comprise the preferred aldehydic component in the preparation of the thermosetting condensates which can be light-stabilized in accordance with this invention. Nevertheless, for certain applications it may be desirable to use aldehydes such as acetaldehyde, propionaldehyde, butyraldehyde, acrolein, methacrolein, crotonaldehyde, benzaldehyde, furfural, etc., mixtures thereof or mixtures of formaldehyde with any one or more of the above-mentioned aldehydes.

The unalkylated thermosetting resinous compositions to which this invention relates may be shaped or formed by molding, extruding, laminating or the like at temperatures ranging, for example from about 130° C. to 180° C. and pressures varying from about 1000 to 10,000 p.s.i. They may be molded by compression, injection or transfer molding techniques well known in the art.

The alkylated resins for use in protective coating applications may be applied to the substrate as liquid solutions by spraying, roller coating, etc., and then cured at elevated temperatures at atmospheric pressure.

When resins to which this invention relates are employed in the preparation of a thermosetting resinous molding composition, a filler, as is well known in the art, may be employed. Obviously to derive the optimum beneficial features of this invention, the filler should be of a type which does not contribute an objectionable color to the plastic composition. The amount of filler employed will depend upon the ultimate use of the molding compositions and properties sought and, therefore, may vary over a wide range up to as high as 80% by weight, based on the total weight of the final molding composition. Illustrative examples of fillers that may be incorporated into the molding composition are such as alpha-cellulose, fibrous or powder asbestos, fiber glass, yarn cuttings, diatomaceous earth, powdered or flaked mica, cloth cuttings (e.g., silk, rayon, linen, cotton, nylon or cloth made from glass fibers or from polymeric or copolymeric acrylonitrile fibers, etc.) silica, etc. Preferably, the amount of filler based on the total weight of the molding composition is in the order of about 30% by weight. For certain applications no filler need be present.

The filler may be incorporated into the resinous composition by any means well known in the art. Thus, the amino resin syrup following the condensation reaction may be dried, as for example, by tray drying, vacuum concentrating or the like, to produce a dry composition. This dry composition may then be comminuted and combined with the filler as for example in a ball mill or the like. Alternately and preferably, the filler is combined with the resinous syrup in a mixing operation. This also represents the preferable time and method for incorporating the light-stablizing agent. The homogeneously blended resin-impregnated filler is then dried to a desirable volatile content, as for example in a continuous dryer, and the material then reduced to a desired particle size suitable for molding by conventional methods.

During the preparation of a molding composition, white pigments such as the titanium dioxide types may be added in order to impart opacity to the product. If desired, mold lubricants such as zinc stearate and the like; curing agents such as phthalic anhydride, benzoyl peroxide, benzoic acid, tetrachlorophthalic anhydride and the like; as well as other additives such as plasticizers may be combined with the resinous component during the formation of the molding composition.

The utilization of my invention to prepare light-stable decorative laminates constitutes an important aspect thereof. However, details regarding the production of such laminates will be given in the specific embodiments hereinbelow.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

PREPARATION OF 2,4-DIAMINO-6-(p-ALKOXY-STYRYL)-S-TRIAZINE 2,4-diamino-6-(p-methoxystyryl)-S-triazine was made in the following manner. 15 parts of anisaldehyde and 15 parts acetoguanamine were mixed in a glass container to which 45 parts of concentrated sulfuric acid were added with stirring. The mixture was heated for ½ hour on a steam bath. The reaction mixture was then slurried with water followed by neutralization with sodium carbonate. Upon filtering the slurry, a light tan product was obtained which was washed with water. The crude product was then washed with ethanol. The washed product was subsequently dissolved in an ethanol-water mixture and then recrystallized therefrom. The recrystallization was repeated whereupon a bright yellow product was obtained having a melting point of 237–240° C. The compound was tested for U.V. absorption which indicated a maximum absorption at 325 millimicrons with a falling off of the absorption above that value.

While the above procedure shows specifically the preparation of 2,4-diamino-6-(p-methoxystyryl)-S-triazine, the various other alkoxy variations of this compound may be prepared by observing the generalized procedure. Thus, for example 2,4-diamino-6-(p-ethoxystyryl)-S-triazine may be prepared by reacting p-ethoxy-benzaldehyde with acetoguanamine in equal proportion in the same manner as employed in preparing a condensate of anisaldehyde given above.

*Example 1*

An aminotriazine resin constituting the condensation product of formaldehyde with melamine wherein the mol ratio of formaldehyde to melamine is 2.0 is prepared as follows. Into a suitable reaction vessel equipped with a stirrer, thermometer and reflux condenser were charged 1743 parts of 37% aqueous formaldehyde (Formalin) and 1000 parts of demineralized water. The system was adjusted to a pH of 8.5 with triethylamine. Thereupon, 1355 parts of melamine were added and heat applied to the reaction medium. The temperature was raised to the reflux point (98–102° C.) and held at this temperature until a standard condition of hydrophobicity is obtained which is indicated when four drops of the reaction medium, when added to 25 milliliters of water at 0–3° C., results in a solution having a blue haze. At this point, the resinous syrup was rapidly cooled to approximately 65° C. and vacuum concentrated at 23 inches vacuum (approximately 7 "Hg pressure") until a resinous syrup having 51.3% resin solids was obtained. To this aqueous syrup was added a sufficient amount of isopropanol in order to reduce the resins solids content to 50%. This adjustment resulted in a syrup having 50% resin solids and a solvent system consisting of 95/5, water/isopropanol.

The resinous syrup was divided into three equal portions. To one portion no additive in the form of light-stabilizer was added. This served as a control resin in the subsequent testing. To the other portions of the resinous syrup were added 0.05% and 0.10%, respectively, of 2,4-diamino-6-(p-methoxystyryl)-S-triazine based on resin solids.

In preparing decorative laminates from the laminating syrups described above, a substantially pure grade of alpha-cellulose paper (H-812 overlay, Hurlbut Paper Co.) was impregnated with each of the light-stabilized laminating syrups and the control laminating syrup. The resin-impregnated papers were then dried under a battery of heat lamps. Solid resin pickup was in the order of 66±0.5%. In the drying operation the heat lamps were so adjusted so as to give dry impregnates containing about 4.5% volatile content.

A laminate assembly was made constituting a sheet of impregnated overlay, a sheet of white paper (H-499, Hurlbut Paper Co.) impregnated with a melamine-formaldehyde resin as a barrier sheet, and six sheets of standard core stock. The assembly of the various sheets was in the order mentioned. The plies were consolidated by heating for fifteen minutes at 150° C. under a pressure of 1100 p.s.i.

The laminates were then tested for light-stability by three methods. These methods included sunlight exposure, weatherometer testing and outdoor exposure. The sunlamp test consisted of exposing the decorative faces of the laminates to a Model S-5 sunlamp (General Electric Co.). In the weatherometer test, the laminate specimens were subjected to alternate standard cycles of heating and concurrent heating and wetting while exposed to U.V. radiation. In the outdoor exposure test, the test panels were exposed exteriorly at a 45° angle facing south.

Color values were determined for all the laminates in each test before and after their exposure in the respective tests. Color value refers to that value obtained according to the following formula:

$$\text{Color value} = \frac{R \text{ at } 700 \text{ mu} - R \text{ at } 400 \text{ mu}}{R \text{ at } 700 \text{ mu}} \times 100$$

where R is the reflectance value as measured on a G.E. recording spectrophotometer.

The results obtained in the various exposure tests are indicated in terms of color change upon exposure as shown in the following tables.

TABLE 1.—COLOR VALUES OF DECORATIVE LAMINATES BEFORE AND AFTER 1,000 HRS. WEATHEROMETER EXPOSURE

| Absorber, Conc. Percent | Color Before Exposure | Color After Exposure | Color Change |
|---|---|---|---|
| 0.000 (Control) | 19.7 | 26.2 | 6.5 |
| 0.050 | 21.2 | 26.9 | 5.7 |
| 0.100 | 22.2 | 25.5 | 3.3 |

TABLE 2.—COLOR VALUES OF DECORATIVE LAMINATES BEFORE AND AFTER 22 HRS. SUNLAMP EXPOSURE

| Absorber, Conc. Percent | Color Before Exposure | Color After Exposure | Color Change |
|---|---|---|---|
| 0.000 | 19.0 | 39.0 | 20.0 |
| 0.050 | 20.5 | 37.0 | 16.5 |
| 0.100 | 22.8 | 37.0 | 14.2 |

TABLE 3.—COLOR VALUES OF DECORATIVE LAMINATES BEFORE AND AFTER 3 MONTHS OUTDOOR EXPOSURE

| Absorber, Conc. Percent | Color Before Exposure | Color After Exposure | Color Change |
|---|---|---|---|
| 0.000 | 19.7 | 33.1 | 13.4 |
| 0.050 | 21.8 | 32.8 | 11.0 |
| 0.100 | 22.8 | 31.8 | 9.0 |

The results set forth in Tables 1-3 show that the inclusion of the light-stabilizers of this invention within the thermosetting resin composition decreases the color change observable after the laminates prepared therefrom have been exposed to actinic radiation. While these color values represent the best known manner for statistically classifying data of this type, they are unfortunately lacking in expressing the subjective significance of the color variation between the exposed control and the laminate prepared from a composition containing the light-stabilizer. In this regard, it is mentioned that the degree of difference in yellowing and graying can be established visually very easily.

*Example 2*

Sheets of an alpha-cellulose paper (H-812, Hurlbut Paper Co.) were impregnated with the control resinous syrup of Example 1 and the syrup of said example containing 0.1% 2,4-diamino-6-(p-methoxystyryl)-S-triazine. Solid resin pickup in each instance was 65%. The impregnated sheets were dried to a volatile content of 5%. One-eighth inch solid laminates were prepared by assembling eight 2" discs cut from a given impregnated sheet and consolidating same at 1100 p.s.i. for 5 minutes at 150° C. Both laminates were then exposed for 50 hours to a S-1 sunlamp.

Comparison of color curves of the solid laminates of this example was not possible on the "color value" basis employed in Example 1. This is due to the irregular form of spectrophotometric reflectance curves obtained for the instant type specimens. However, yellowness after exposure was mathematically computed by integration as follows:

$$\Delta \text{ yellow (control)} \begin{matrix} = 1.35 \times 10^{-2} \\ \equiv 0.9 \text{ Judd units} \end{matrix}$$

$$\Delta \text{ yellow (0.1\% absorber)} \begin{matrix} = 0.88 \times 10^{-2} \\ \equiv 0.6 \text{ Judd units} \end{matrix}$$

It was readily apparent from a visual observation of the two exposed laminates that the specimen containing no absorber was significantly more yellow and gray than the specimen containing the light absorber.

*Example 3*

A benzoguanamine-formaldehyde resin intermediate was prepared by reaction in the proportion of 1 mol of benzoguanamine and 2 mols of formaldehyde. Reaction was carried out in an aqueous medium at reflux point at an initially neutral pH value until precipitation first occured and concentration and dehydration then carried out under reduced pressure at 65° C. The dry resin was dissolved at a solids concentration of 60% in a solvent composed of 60 parts by weight of ethylene glycol monomethylether and 40 parts of ethanol.

A portion of this solution, 1668 parts, was mixed with 538 parts of chopped alpha-cellulose and the mix dried at 70° C., and then ground with lubricant and curing agent. This resinous material served as a control in the subsequent exposure test.

A second portion of the solution amounting to 1668 parts was introduced into a mixer whereupon 2.0 parts of 2,4-diamino-6-(p-ethoxystyryl)-S-triazine were added and homogeneously mixed therewith. Thereupon, 538 parts of chopped cellulose was added, mixed and dried in a similar manner as employed in preparing the control composition.

The ground control composition and the ground composition containing the light-stabilizer were molded into test discs having a thickness of approximately ⅛" and a diameter of 4 inches. The curing conditions were 4 minutes at 155° C. at 1000 p.s.i.

Each of the test discs were then exposed to a S-1 sunlamp for 25 hours and compared with similar discs which were not exposed. The control disc darkened perceptibly under these exposure conditions, whereas the material containing the light-stabilizer showed no observable difference in color from that of the unexposed disc.

*Example 4*

An aqueous urea-formaldehyde syrup was prepared by low temperature reaction in a molar ratio of formaldehyde to urea of 1.3. The condensation was effected at a pH slightly above the neutral point. When the reaction had advanced to where the free formaldehyde was 8.0%, it was divided into two parts. The first part was mixed directly with cellulose pulp. The second part was mixed with 0.1%, based on resin solids, of 2,4-diamino-6-(p-methoxystyryl)-S-triazine, followed by mixing with cellulose pulp in the same proportion as used to prepare the control composition. After drying, the compositions were ground and blended in the usual way with lubricant and curing agent. When molded, the moldings were exposed to a S-1 sunlamp for 15 hours. The molding containing the light-stabilizer upon exposure showed significantly less yellowing than the control composition containing no stabilizer.

*Example 5*

365 parts of 37% aqueous formaldehyde were neutralized with aqueous sodium hydroxide (50%) to a pH of 8.5. To the basic formaldehyde solution were added 126 parts of melamine and the mixture refluxed for 2 hours. 600 parts of n-butanol and 1.7 parts of a 5% phosphoric acid where then added with the butanol being introduced gradually in small amounts so that a clear solution is maintained. The solution was refluxed for a further period of approximately 1 hour, after which is was dehydrated by distilling off a butanol-water mixture. Butanol was constantly added to the syrup at a rate which resulted in a composition of 50 parts of resin, 25 parts of butanol at the completion of dehydration. Xylol in the amount of 25 parts was then added to the syrup.

The above butylated melamine resin was blended with an alkyd, which served as a plasticizer therefor, in the proportion of 70:30, respectively, on a solids basis. The plasticizing alkyd was a condensation product of 2 mols of phthalic anhydride, 1 mol of glycerol and 1 mol of benzoic acid. The acid number of the alkyd was approximately 30.

To two equal portions of the plasticized composition was added rutile titanium dioxide pigment in the amount so as to give a pigment to resin ratio of approximately 3:1. To one of these portions, 6% of 2,4-diamino-6-(p-propoxystyryl)-S-triazine was added based on solid resin content of the unground paste. After suitably mixing the ungrounds, enamal-like dispersion of the pigment was obtained by grinding on a conventional three-roll paint mill. To each of these grounds was added an amount of unpigmented syrup so as to achieve a 1.1:1, pigment to resin ratio. Spraying consistency was obtained by addition of a solvent consisting of an equal mixture of xylol and butanol. The enamel was then sprayed on primed, bonderized steel panels and baked in an oven for 20 minutes at 250° C. The panels were then exposed exteriorly in the manner used to expose the decorative laminates of Example 1. After three months' exposure, the panels were compared with unexposed panels, which observation indicated that the enamel containing the light-stabilizer had yellowed only perceptibly whereas the panel containing the composition having no light-stabilizing additive was observed to be yellower and grayer than the former.

I claim:

1. A resinous composition of matter which comprises a thermosetting resinous condensate of from about 1 to 6 mols of an aldehyde with a mol of an amidogen selected from the group consisting of melamine, urea and benzoguanamine, and as a light-stabilizer therefor, from about 0.01 to 5% of a 2,4-diamino-6-(p-alkoxystyryl)-S-triazine.

2. A resinous composition of matter which comprises a thermosetting resinous condensate of from about 1 to 6 mols of formaldehyde with a mol of an amidogen selected from the group consisting of melamine, urea and benzoguanamine, and as a light-stabilizer therefor, from about 0.01 to 5% of a 2,4-diamino-6-(p-alkoxy-styryl)-S-triazine.

3. A resinous composition of matter which comprises a thermosetting resinous condensate of from 1 to 6 mols of formaldehyde with a mol of melamine, and as a light-stabilizer therefor, from about 0.01 to 5% of a 2,4-diamino-6-(alkoxystyryl)-S-triazine.

4. A resinous composition of matter which comprises a thermosetting resinous condensate of from 1 to 6 mols of formaldehyde with a mol of melamine, and as a light-stabilizer therefor, from about 0.01 to 5% of a 2,4-diamino-6-(p-methoxystyryl)-S-triazine.

5. A resinous composition of matter which comprises a thermosetting resinous condensate of from 1 to 6 mols of formaldehyde with a mol of melamine, and as a light-stabilizer therefor, from about 0.01 to 5% of a 2,4-diamino-6-(p-ethoxystyryl)-S-triazine.

6. A resinous composition of matter which comprises a thermosetting resinous condensate of from 1 to 6 mols of formaldehyde with a mol of melamine, and as a light-stabilizer therefor, from about 0.01 to 5% of a 2,4-diamino-6-(p-propoxystyryl)-S-triazine.

7. A light-stable, insoluble and infusible product of the thermosetting resinous composition according to claim 3.

8. A resinous composition of matter which comprises a thermosetting resinous condensate of from about 1 to 4 mols of formaldehyde with a mol of urea, and as a light-stabilizer therefor, from about 0.01 to 5% of a 2,4-diamino-6-(p-alkoxystyryl)-S-triazine.

9. A resinous composition of matter which comprises a thermosetting resinous condensate of from about 1 to 4 mols of formaldehyde with a mol of urea, and as a light-stabilizer therefor, from about 0.01 to 5% of a 2,4-diamino-6-(p-methoxystyryl)-S-triazine.

10. A light-stable, insoluble and infusible product of the thermosetting resinous composition according to claim 8.

11. A resinous composition of matter which comprises a thermosetting resinous condensate of from about 1 to 4 mols of formaldehyde with a mol of benzoguanamine, and as a light-stabilizer therefor, from about 0.01 to 5% of a 2,4-diamino-6-(p-alkoxystyryl)-S-triazine.

12. A resinous composition of matter which comprises a thermosetting resinous condensate of from about 1 to 4 mols of formaldehyde with a mol of benzoguanamine, and as a light-stabilizer therefor, from about 0.01 to 5% of a 2,4-diamino-6-(p-methoxystyryl)-S-triazine.

13. A light-stable, insoluble and infusible product of the thermosetting resinous composition according to claim 11.

14. A heat- and pressure-consolidated decorative laminate of superimposed sheets of resinous impregnated fibrous material wherein the exterior sheet of said superimposed sheets is a decorative overlay impregnated with a resinous composition comprising a thermosetting resinous condensate of from about 1 to 6 mols of formaldehyde with 1 mol of melamine containing from about 0.01 to 5% of a 2,4-diamino-6-(p-alkoxystyryl)-S-triazine.

15. A heat- and pressure-consolidated decorative laminate of superimposed sheets of resinous impregnated fibrous material wherein the exterior sheet of said superimposed sheets is a decorative overlay impregnated with a resinous composition comprising a thermosetting resinous condensate of from about 1 to 6 mols of formaldehyde with 1 mol of melamine containing from about 0.01 to 5% of a 2,4-diamino-6-(p-methoxystyryl)-S-triazine.

References Cited in the file of this patent

UNITED STATES PATENTS

| | | |
|---|---|---|
| 2,689,238 | Thomas | Sept. 14, 1954 |
| 2,714,057 | Chenicek | July 26, 1955 |

UNITED STATES PATENT OFFICE
CERTIFICATION OF CORRECTION

Patent No. 2,944,999                      July 12, 1960

Francis J. Abbruscato

It is hereby certified that error appears in the above numbered patent requiring correction and that the said Letters Patent should read as corrected below.

In the heading to the printed specification, lines 2 to 4, title of invention, for "RESINOUS COMPOSITIONS LIGHT STABILIZED WITH A 2,4-DIAMINO-6-(p-ALKOXY-STYRYL)-s-TRIAZINE" read -- RESINOUS COMPOSITIONS LIGHT STABILIZED WITH A 2,4-DIAMINO-6-(p-ALKOXYSTYRYL)-S-TRIAZINE --; column 9, line 39, for "where" read -- were --; line 42, for "is" read -- it --; line 61, for "enamal-like" read -- enamel-like --; column 10, lines 16 and 17, for "2,4-diamino-6-(p-alkoxy-styryl)-S-triazine" read -- 2,4-diamino-6-(p-alkoxystyryl)-S-triazine --; lines 19, 24, 29, and 34, after "from", each occurrence, insert -- about --; same column 10, lines 21 and 22, for "2,4-diamino-6-(alkoxy-styryl)-S-triazine" read -- 2,4-diamino-6-(p-alkoxystyryl)-S-triazine --.

Signed and sealed this 1st day of August 1961.

(SEAL)
Attest:

ERNEST W. SWIDER
Attesting Officer

DAVID L. LADD
Commissioner of Patents